(12) United States Patent
Nagashima et al.

(10) Patent No.: US 7,145,844 B2
(45) Date of Patent: Dec. 5, 2006

(54) OPTICAL HEAD WITH ADJUSTABLE BEAM SHAPING ELEMENT

(75) Inventors: Kenji Nagashima, Takatsuki (JP); Youichi Saitoh, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 488 days.

(21) Appl. No.: 10/615,676

(22) Filed: Jul. 8, 2003

(65) Prior Publication Data

US 2004/0013078 A1     Jan. 22, 2004

(30) Foreign Application Priority Data

Jul. 22, 2002    (JP)                2002-212979

(51) Int. Cl.
      *G11B 7/135*       (2006.01)

(52) U.S. Cl. .............. 369/44.23; 369/112.03; 369/112.28

(58) Field of Classification Search ............. None
See application file for complete search history.

(56) References Cited

U.S. PATENT DOCUMENTS 4,969,137 A    11/1990   Sugiyama et al.
6,201,228 B1*   3/2001   Yoshida ............... 250/201.5
6,392,977 B1*   5/2002   Ando et al. ........... 369/112.01
6,567,366 B1    5/2003   Kim et al.
6,744,720 B1*   6/2004   Ando ................... 369/112.21
2002/0012314 A1   1/2002   Kim et al.

FOREIGN PATENT DOCUMENTS

CN          1210333      3/1999

* cited by examiner

*Primary Examiner*—William Korzuch
*Assistant Examiner*—Joseph Haley
(74) *Attorney, Agent, or Firm*—Hamre, Schumann, Mueller & Larson, P.C.

(57) ABSTRACT

An optical head by which a good detection signal can be obtained based on a zeroth-order diffracted beam and first-order diffracted beams is provided. The optical head includes: a shaping element for shaping a beam emitted from a light source; a converging element for converging the beam that has been shaped by the shaping element on an optical recoding medium; and a detector for detecting an electric signal based on a zeroth-order diffracted beam and a first-order diffracted beam contained in the beam that has been reflected by the optical recoding medium. The shaping element is provided in a swingable manner so that a distance between a spot position at which the zeroth-order diffracted beam is incident on the detector and a spot position at which the first-order diffracted beam is incident on the detector can be adjusted.

14 Claims, 14 Drawing Sheets

OPTICAL HEAD WITH ADJUSTABLE BEAM SHAPING ELEMENT

BACKGROUND OF THE INVENTION

1. Field of the Invention

The present invention relates generally to an optical head. In particular, the present invention relates to an optical head having a beam-shaping prism for shaping a beam.

2. Description of the Related Art

FIG. 16A is a front view schematically showing the configuration of a conventional optical head 90, and FIG. 16B is a plan view of the same. The optical head 90 has a semiconductor laser source 5. The semiconductor laser source 5 emits a beam to a polarization beam splitter 6. The beam emitted from the semiconductor laser source 5 passes through the polarization beam splitter 6 to be incident on a collimator lens 4. The collimator lens 4 converts the incident beam into a parallel beam and then emits the parallel beam to a beam-shaping prism 91.

The beam-shaping prism 91 has an entrance surface to which the parallel beam that has been converted by the collimator lens 4 enters and an emission surface from which the parallel beam that has been shaped by the beam-shaping prism 91 is emitted to a hologram 13. The entrance surface and the emission surface are formed so as not to be parallel with each other. The beam-shaping prism 91 shapes the parallel beam incident on its entrance surface so that the width thereof is expanded by a factor of 2.55. The parallel beam thus shaped is then emitted from the emission surface of the beam-shaping prism 91 to the hologram 13.

The parallel beam emitted from the emission surface of the beam-shaping prism 91 passes through the hologram 13 and a quarter-wave plate (not shown) and then is incident on an objective lens 3. The objective lens 3 converges the incident parallel beam on an optical disk 19.

The parallel beam is reflected by the optical disk 19 and passes through the objective lens 3 and the quarter-wave plate (not shown). After passing through the quarter-wave plate, the parallel beam becomes a linearly polarized light orthogonal to an optical path along which the beam emitted from the semiconductor laser source 5 travels toward the optical disk 19 (hereinafter, referred to simply as a "forward optical path"). The linearly polarized light then passes through the hologram 13. Because the parallel beam has a polarization plane orthogonal to the forward optical path, it is split into a zeroth-order diffracted beam and first-order diffracted beams after passing through the hologram 13.

The parallel beam that has been split into the zeroth-order diffracted beam and the first-order diffracted beams by the hologram 13 is incident on the beam-shaping prism 91 again. This time, contrary to the case where the beam travels along the forward optical path, the beam-shaping prism 91 shapes the parallel beam so that the width thereof is reduced by a factor of 2.55. The parallel beam thus shaped is then emitted to the collimator lens 4. After passing through the collimator lens 4, the beam is incident on the polarization beam splitter 6.

Because the polarization plane of the beam incident on the polarization beam splitter 6 is orthogonal to the forward optical path, the beam is reflected by the polarization beam splitter 6 to be incident on a detector 92.

FIG. 17 is a schematic view for illustrating a spot position of the beam incident on the detector 92. The detector 92 has a light-receiving region 99 for receiving the zeroth-order diffracted beam contained in the incident beam. The light-receiving region 99 has a substantially square shape and is divided into four regions having a square shape.

On both sides of the light-receiving region 99 in the direction along which the beam is shaped (hereinafter, referred to simply as the "beam-shaping direction"), light-receiving regions 81 and 82 for receiving the first-order diffracted beams contained in the beam incident on the detector 92 are provided, respectively. Each of the light-receiving regions 81 and 82 is divided along the beam-shaping direction so as to provide three regions having a substantially rectangular shape.

The zeroth-order diffracted beam is incident on a spot position indicated by the oval on the light-receiving region 99. On the other hand, the first-order diffracted beams are incident on spot positions indicated by the ovals on the light-receiving regions 81 and 82, respectively.

For example, in the case where the shape of the beam-shaping prism 91 deviates from the intended shape or the position of the beam-shaping prism 91 deviates from the intended position, the spot positions of the first-order diffracted beams may be displaced from the center portions of the light-receiving regions 81 and 82. For example, the spot position of the first-order diffracted beam indicated by the oval on the light-receiving region 81 may be displaced from the center portion of the light-receiving region 81 toward the right side of FIG. 17, and the spot position of the first-order diffracted beam indicated by the oval on the light-receiving region 82 may be displaced from the center portion of the light-receiving region 82 toward the left side of FIG. 17. In this case, by providing the detector 92 in a swingable manner and swinging the detector 92 in a clockwise direction indicated by the arrow A2 in FIG. 17, the spot position of the first-order diffracted beam on the light-receiving region 81 can be moved toward the center portion of the light-receiving region 81, and the spot position of the first-order diffracted beam on the light-receiving region 82 can be moved toward the center portion of the light-receiving region 82.

FIG. 18 is a view schematically showing the configuration of another conventional optical head 90A, and FIG. 19 is a schematic view for illustrating a spot position of the beam incident on a detector 92A provided in the optical head 90A. In FIGS. 18 and 19, the same components as those in the optical head 90 described above with reference to FIGS. 16A, 16B, and 17 bear the same reference numerals, and their detailed explanation thus has been omitted. The optical head 90A differs from the above-described optical head 90 in that it employs the detector 92A in place of the detector 92.

The detector 92A has a light-receiving region 99 for receiving the zeroth-order diffracted beam contained in the incident beam. The light-receiving region 99 has a substantially square shape and is divided into four regions having a square shape.

On both sides of the light-receiving region 99 in the direction perpendicular to the beam-shaping direction, light-receiving regions 81 and 82 for receiving the first-order diffracted beams contained in the beam incident on the detector 92A are provided, respectively. Each of the light-receiving regions 81 and 82 is divided along the beam-shaping direction so as to provide three regions having a substantially rectangular shape.

The zeroth-order diffracted beam is incident on a spot position indicated by the oval on the light-receiving region 99. On the other hand, the first-order diffracted beams are incident on spot positions indicated by ovals on the light-receiving regions 81 and 82, respectively.

In the case where the shape of the beam-shaping prism 91 only slightly deviates from the intended shape and the position of the beam-shaping prism 91 also only slightly deviates from the intended position, the spot positions of the first-order diffracted beams are in the center portions of the light-receiving region 81 and 82, respectively. Therefore, it is possible to obtain a good detection signal based on the first-order diffracted beams.

However, for example, in the case where the shape of the beam-shaping prism 91 deviates from the intended shape or the position of the beam-shaping prism 91 deviates from the intended position, the spot positions of the first-order diffracted beams may be displaced from the center portions of the light-receiving regions 81 and 82. For example, the spot position of the first-order diffracted beam indicated by the oval on the light-receiving region 81 may be displaced from the center portion of the light-receiving region 81 toward the light-receiving region 99, and the spot position of the first-order diffracted beam indicated by the oval on the light-receiving region 82 may be displaced from the center portion of the light-receiving region 82 toward the light-receiving region 99.

The light-receiving region 82 for receiving the first-order diffracted beam, the light-receiving region 99 for receiving the zeroth-order diffracted beam, and the light-receiving region 81 for receiving the first-order diffracted beam are arranged along the direction perpendicular to the beam-shaping direction. Accordingly, even if the detector is swung in the manner as described above with reference to FIG. 17, the spot position of the first-order diffracted beam on the light-receiving region 81 is not moved toward the center portion of the light-receiving regions 81, nor the spot position of the first-order diffracted beam on the light-receiving region 82 is not moved toward the center portion of the light-receiving regions 82.

The present invention is intended to solve the above-mentioned conventional problems. It is an object of the present invention to provide an optical head by which a good detection signal can be obtained based on a zeroth-order diffracted beam and first-order diffracted beams.

SUMMARY OF THE INVENTION

An optical head according to one aspect of the present invention includes: a shaping element for shaping a beam emitted from a light source; a converging element for converging the beam that has been shaped by the shaping element on an optical recoding medium; and a detector for detecting an electric signal based on a zeroth-order diffracted beam and a first-order diffracted beam contained in the beam that has been reflected by the optical recoding medium. The shaping element is provided in a swingable manner so that a distance between a spot position at which the zeroth-order diffracted beam is incident on the detector and a spot position at which the first-order diffracted beam is incident on the detector can be adjusted.

An optical head according to another aspect of the present invention includes: a shaping element for shaping a first beam emitted from a first light source and a second beam emitted from a second light source; a converging element for converging the first beam and the second beam that has been shaped by the shaping element on an optical recoding medium; a first detector for detecting an electric signal based on a first zeroth-order diffracted beam and a first first-order diffracted beam contained in the first beam that has been reflected by the optical recoding medium and passed through the converging element; and a second detector for detecting an electric signal based on a second zeroth-order diffracted beam and a second first-order diffracted beam contained in the second beam that has been reflected by the optical recoding medium and passed through the converging element. The shaping element is provided in a swingable manner so that a distance between a spot position at which the first zeroth-order diffracted beam is incident on the first detector and a spot position at which the first first-order diffracted beam is incident on the first detector can be adjusted.

These and other advantages of the present invention will become apparent to those skilled in the art upon reading and understanding the following detailed description with reference to the accompanying figures.

DETAILED DESCRIPTION OF THE INVENTION

Figure 1:
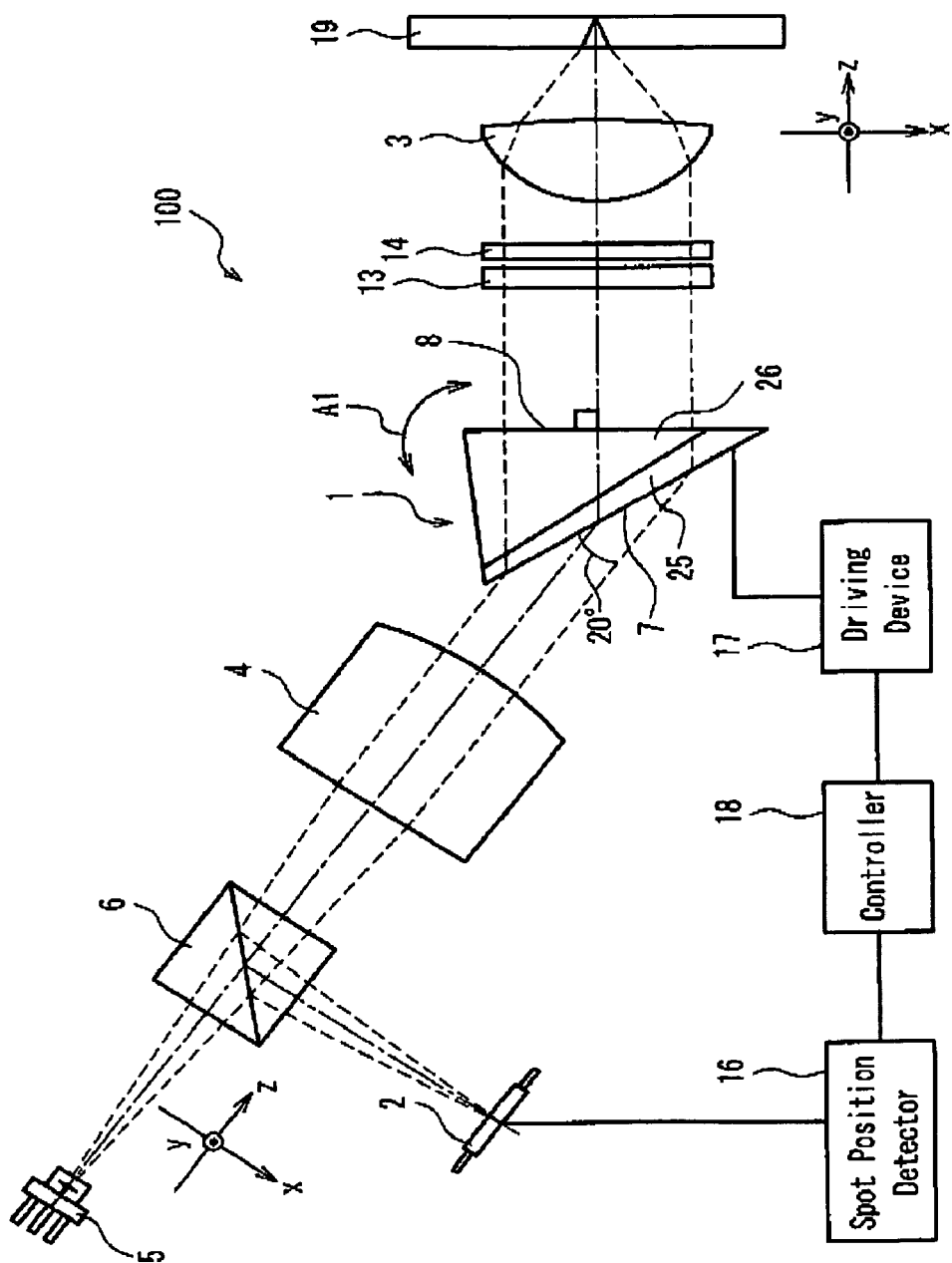
FIG. 1 is a view schematically showing the configuration of an optical head according to Embodiment 1 of the present invention.

In an optical head according to one embodiment of the present invention, a shaping element is provided in a swingable manner so that a distance between a spot position at which a zeroth-order diffracted beam is incident on a detector and a spot position at which a first-order diffracted beam is incident on the detector can be adjusted. Therefore, it is possible to correct the distance between the spot position of the zeroth-order diffracted beam and the spot position of the first-order diffracted beam. As a result, it becomes possible to obtain a good detection signal based on the zeroth-order diffracted beam and the first-order diffracted beam. It is preferable that the optical head further includes a collimator lens for converting the beam emitted from the light source into a substantially parallel beam, wherein the shaping element is used for shaping the substantially parallel beam emitted from the collimator lens and is provided so as to be swingable around a swing axis that is perpendicular to a direction along which the substantially parallel beam is shaped and perpendicular to a travel direction of the substantially parallel beam.

Furthermore, it is preferable that the detector has a light-receiving region for receiving the zeroth-order diffracted beam and a light-receiving region for receiving the first-order diffracted beam, and these light-receiving regions are arranged in a direction along which the zeroth-order diffracted beam and the first-order diffracted beam are shaped.

Furthermore, it is preferable that the shaping element is provided in a swingable manner so that the spot position of the first-order diffracted beam can be adjusted to be in a center portion of the light-receiving region for receiving the first-order diffracted beam.

Furthermore, it is preferable that the light-receiving region for receiving the first-order diffracted beam is divided along a direction perpendicular to the direction along which the zeroth-order diffracted beam and the first-order diffracted beam are shaped.

Furthermore, it is preferable that the detector has a light-receiving region for receiving the zeroth-order diffracted beam and two light-receiving regions for receiving the first-order diffracted beam.

Furthermore, it is preferable that the light-receiving region for receiving the zeroth-order diffracted beam is arranged between the two light-receiving regions for receiving the first-order diffracted beam.

Furthermore, it is preferable that the optical head further includes a polarization beam splitter for changing a travel direction of a substantially parallel beam that has been reflected by the optical recoding medium and passed through the converging element.

Furthermore, it is preferable that the detector detects the electric signal based on the substantially parallel beam whose travel direction has been changed by the polarization beam splitter.

Furthermore, it is preferable that the polarization beam splitter is arranged between the light source and the shaping element.

Furthermore, it is preferable that the shaping element has an entrance surface from which the substantially parallel beam that has been converted from the beam by the collimator lens enters and an emission surface from which the substantially parallel beam that has been shaped by the shaping element is emitted to the converging element, and the entrance surface and the emission surface are formed so as not to be parallel with each other.

Furthermore, it is preferable that the shaping element is formed by bonding a plurality of optical materials together, and the refractive indices of these optical materials are different from one another.

Furthermore, it is preferable that the shaping element is formed by bonding a plurality of optical materials together, and variations in the refractive indices of these optical materials depending on a wavelength being different from one another.

Furthermore, it is preferable that the optical head further includes a second detector for detecting the distance between the spot position of the zeroth-order diffracted beam and the spot position of the first-order diffracted beam.

Furthermore, it is preferable that the optical head further includes: driving means for swinging the shaping element; and controlling means for controlling the driving means so that the shaping element is swung based on the distance, which has been detected by the second detector, between the spot position of the zeroth-order diffracted beam and the spot position of the first-order diffracted beam.

Furthermore, it is preferable that the light source and the detector are formed integrally.

In the optical head according to another embodiment of the present invention, a shaping element is provided in a swingable manner so that a distance between a spot position at which a zeroth-order diffracted beam is incident on a detector and a spot position at which a first-order diffracted beam is incident on the detector can be adjusted. Therefore, it is possible to correct the distance between the spot position of the zeroth-order diffracted beam and the spot position of the first-order diffracted beam. As a result, it becomes possible to obtain a good detection signal based on the zeroth-order diffracted beam and the first-order diffracted beam.

It is preferable that the optical head further includes: a first collimator lens for converting the first beam emitted from the first light source into a first parallel beam; a second collimator lens for converting the second beam emitted from the second light source into a second parallel beam; and a polarization beam splitter for transmitting the first parallel beam that has been converted from the first beam by the first collimator lens and changing a travel direction of the second parallel beam that has been converted from the second beam by the second collimator lens, wherein the shaping element shapes the first parallel beam and the second parallel beam.

Furthermore, it is preferable that the first detector and the second detector are formed integrally.

Furthermore, it is preferable that at least one of the first light source and the second light source and at least one of the first detector and the second detector are formed integrally.

Hereinafter, embodiments of the present invention will be described with reference to the accompanying drawings.

EMBODIMENT 1

FIG. 1 is a view schematically showing the configuration of an optical head 100 according to Embodiment 1 of the present invention. The optical head 100 has a semiconductor laser source 5. The semiconductor laser source 5 emits a beam having a wavelength of 657 nm to a polarization beam splitter 6.

In FIG. 1, the Z-axis indicates the travel direction of a beam, the X-axis is an axis that is perpendicular to the Z-axis and parallel to the surface of the paper showing FIG. 1, and the Y-axis is an axis that is perpendicular to the Z-axis and perpendicular to the surface of the paper showing FIG. 1. The same applies to the remaining drawings.

The beam emitted from the semiconductor laser source 5 passes through the polarization beam splitter 6 to be incident on a collimator lens 4 having a focal length of 10.0 mm. The collimator lens 4 converts the incident beam into a parallel beam and then emits the parallel beam to a beam-shaping prism 1.

The beam-shaping prism 1 as a shaping element has a substantially triangular prism shape. The beam-shaping prism 1 has an entrance surface 7 to which the parallel beam that has been converted by the collimator lens 4 enters and an emission surface 8 from which the parallel beam that has been shaped by the beam-shaping prism 1 is emitted to a hologram 13. The entrance surface 7 and the emission surface 8 are formed so as not to be parallel with each other. The beam-shaping prism 1 is formed by bonding two optical materials 25 and 26 with different refractive indices together. The beam-shaping prism 1 has a refractive index of 1.775911 at a wavelength of 657 nm.

The parallel beam from the collimator lens 4 is incident at about 20° on the entrance surface 7. The beam-shaping prism 1 shapes the incident parallel beam so that the width thereof is expanded by a factor of 2.55 by refracting the parallel beam at the above-mentioned refractive index at a wavelength of 657 nm. The parallel beam that has been shaped by the beam-shaping prism 1 is emitted in the direction perpendicular to the emission surface 8.

The beam-shaping prism 1 is provided so as to be swingable around the swing axis, which is perpendicular to the beam-shaping direction and the travel direction of the parallel beam, in the direction indicated by the double-headed arrow A1.

The parallel beam emitted from the emission surface 8 of the beam-shaping prism 1 passes through the hologram 13 and a quarter-wave plate 14. After passing through the quarter-wave plate 14, the parallel beam becomes a circularly polarized light and then is incident on an objective lens 3 as a converging element. The objective lens 3, having a focal length of 3.0 mm and a numerical aperture NA of 0.6, converges the incident parallel beam on an optical disk 19.

Figure 2:
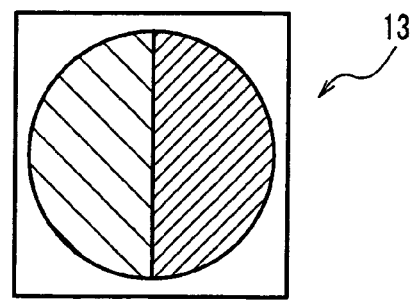
FIG. 2 is a view for illustrating the arrangement of polarization hologram patterns of a polarization hologram element provided in the optical head according to Embodiment 1.

FIG. 2 is a view for illustrating the arrangement of polarization hologram patterns of the hologram 13. The parallel beam is reflected by the optical disk 19 and passes through the objective lens 3 and the quarter-wave plate 14. After passing through the quarter-wave plate 14, the parallel beam becomes a linearly polarized light orthogonal to the forward optical path. The linearly polarized light then passes through the hologram 13. Because the parallel beam has a polarization plane orthogonal to the forward optical path, it is split into a zeroth-order diffracted beam and first-order diffracted beams after passing through the hologram 13.

The parallel beam that has been split into the zeroth-order diffracted beam and the first-order diffracted beams by the hologram 13 is incident on the beam-shaping prism 1 again. This time, contrary to the case where the beam travels along the forward optical path, the beam-shaping prism 1 shapes the parallel beam so that the width thereof is reduced by a factor of 2.55. The parallel beam thus shaped is then emitted to the collimator lens 4. After passing through the collimator lens 4, the beam is incident on the polarization beam splitter 6.

Because the polarization plane of the beam incident on the polarization beam splitter 6 is orthogonal to the forward optical path, the beam is reflected by the polarization beam splitter 6 to be incident on a detector 2.

Figure 3:
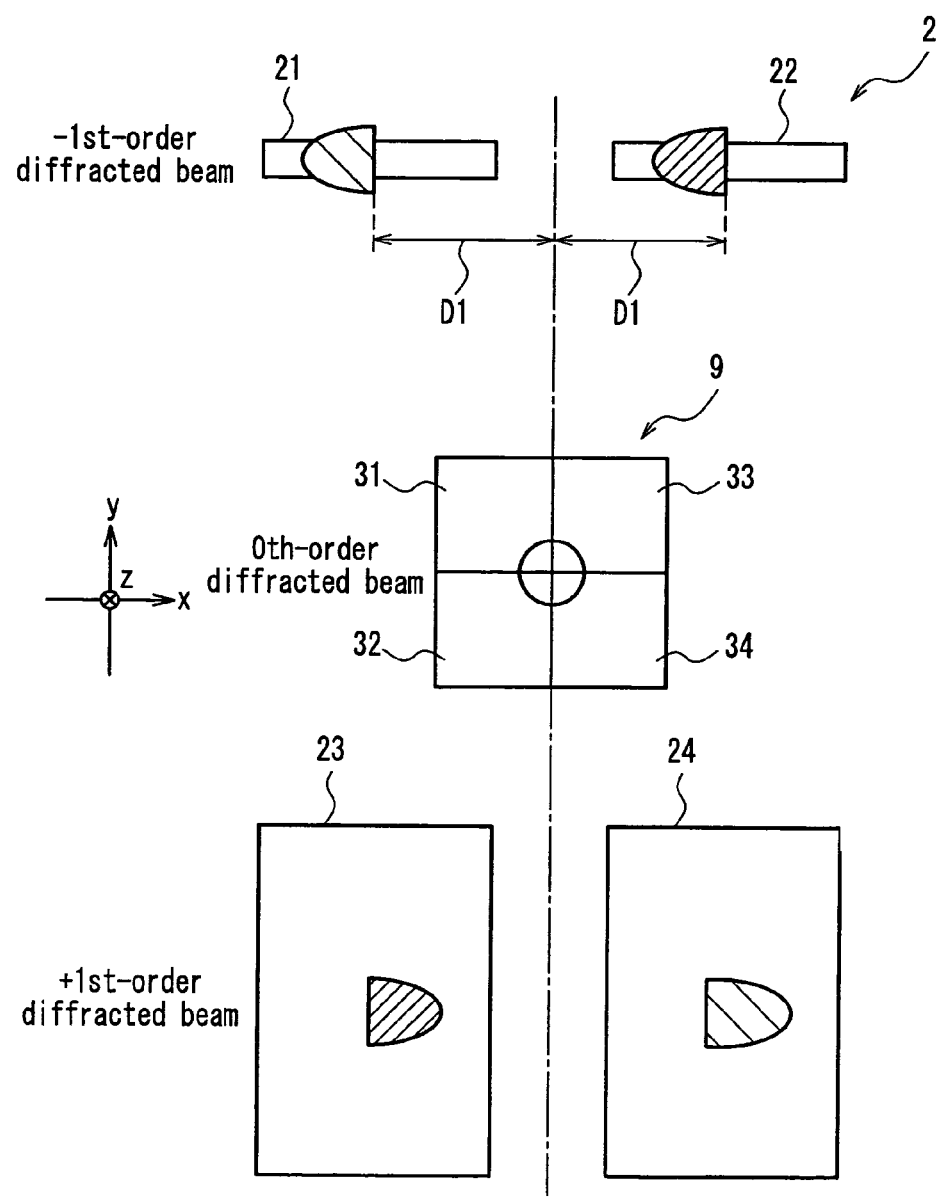
FIG. 3 is a plan view schematically showing a detector provided in the optical head according to Embodiment 1.

FIG. 3 is a plan view schematically showing a detection surface of the detector 2. The detector 2 has a light-receiving region 9 for receiving the zeroth-order diffracted beam contained in the incident beam. The light-receiving region 9 has a substantially square shape and is divided into four regions 31, 32, 33, and 34 having a square shape.

The detector 2 has two light-receiving regions 21 and 22, having a substantially rectangular shape, for receiving the negative first-order diffracted beam contained in the incident beam. The light-receiving regions 21 and 22 are arranged along the beam-shaping direction (the X-axis direction) at a predetermined interval. The detector 2 also has two light-receiving regions 23 and 24, having a substantially rectangular shape, for receiving the positive first-order diffracted beam contained in the incident beam. The light-receiving regions 23 and 24 are arranged so as to oppose the light-receiving regions 21 and 22, respectively, with the light-receiving region 9 intervening therebetween.

Each of the light-receiving regions 21 to 24 is divided along the beam-shaping direction (the X-axis direction) so as to provide three regions (not shown) having a substantially rectangular shape.

Figure 4:
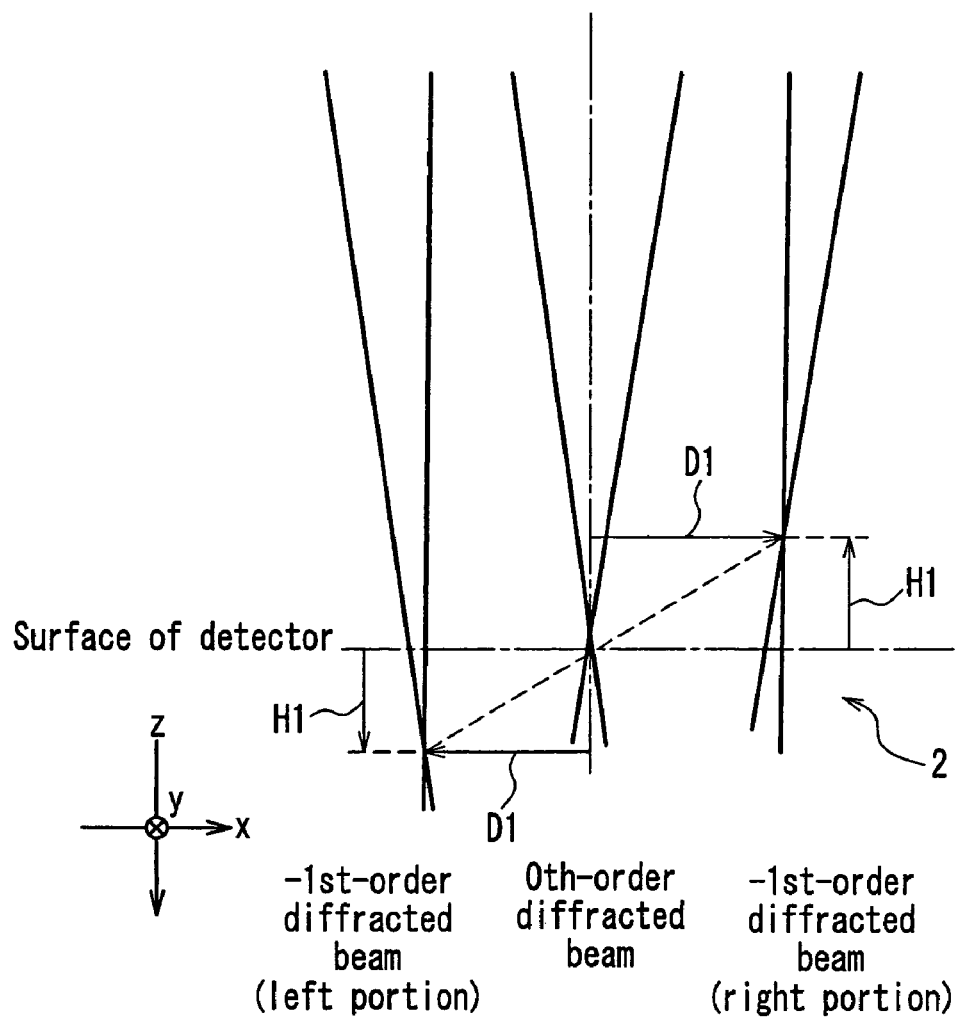
FIG. 4 is a schematic view for illustrating focal positions of diffracted beams incident on the detector provided in the optical head according to Embodiment 1.

FIG. 4 is a schematic view for illustrating focal positions of the diffracted beams incident on the light-receiving region 21 for receiving the first-order diffracted beam, the light-receiving region 9 for receiving the zeroth-order diffracted beam, and the light-receiving region 22 for receiving the first-order diffracted beam, which are provided in the detector 2, respectively. The negative first-order diffracted beam to be incident on the light-receiving region 21 enters the light-receiving region 21 in such a manner that it comes into focus at a position that is at a depth of H1 from the surface of the detector 2 and away from the center of the light-receiving region 9 in the beam-shaping direction (the X-axis direction) toward the light-receiving region 21 by the distance D1. On the other hand, the negative first-order diffracted beam to be incident on the light-receiving region 22 enters the light-receiving region 22 in such a manner that it comes into focus at a position that is at a height of H1 from the surface of the detector 2 and away from the center of the light-receiving region 9 in the beam-shaping direction (the X-axis direction) toward the light-receiving region 22 by the distance D1.

Then, based on a detection signal f1 that has been detected based on the negative first-order diffracted beam incident on the light-receiving region 21 and a detection signal f2 that has been detected based on the negative first-order diffracted beam incident on the light-receiving region 22, a focus error signal fe is generated according to a spot size detection (SSD) method using the following Equation (1).

$$fe = f1 - f2 \qquad (1)$$

Figure 5:
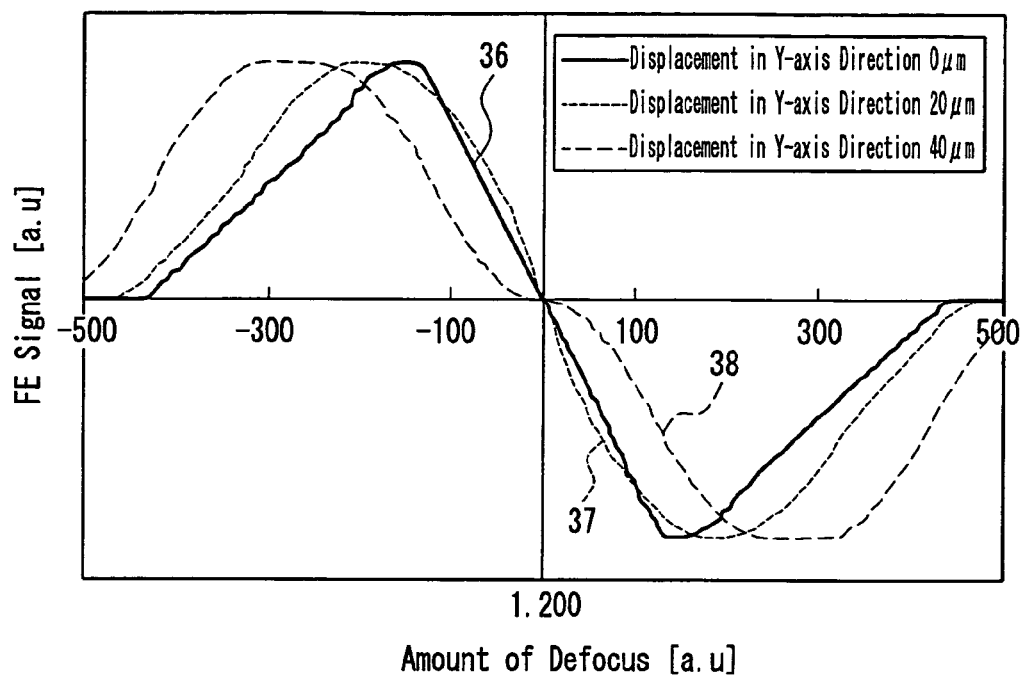
FIG. 5 is a graph showing the relationship between an amount of defocus in the detector provided in the optical head according to Embodiment 1 and a focus error signal.

FIG. 5 is a graph showing the relationship between an amount of defocus in the detector 2 and a focus error signal. In the case where the shape of the beam-shaping prism 1 only slightly deviates from the intended shape and the position of the beam-shaping prism 1 also only slightly deviates from the intended position, the relationship between the amount of defocus in the detector 2 and the focus error signal is represented by a curve 36. The curve 36 is a straight line in the vicinity of the focal position where the amount of defocus is close to zero. Thus, it is possible to obtain a good control signal.

However, if the spot positions of the negative first-order diffracted beams are displaced from the light-receiving regions 21 and 22 in the Y-axis direction due to the deviation in the shape or the position of the beam-shaping prism 1, for example, the relationship between the amount of defocus and the focus error signal is represented by curves 37 and 38. In the curves 37 and 38, the relationship between the amount of defocus and the focus error signal is upset so as to be represented by a curve in the vicinity of the focal position. Thus, a good control signal cannot be obtained.

Such a displacement of the spot positions of the negative first-order diffracted beams from the light-receiving regions 21 and 22 is attributed to the deviation in an angle caused during the manufacture of the beam-shaping prism 1, the deviation in an oscillating wavelength of the semiconductor laser source 5, the inclination of the axis of the beam incident on the beam-shaping prism 1 caused by the displacement of the emission point of the semiconductor laser source 5, and the like.

In Embodiment 1, the shaping element 1 is provided in a swingable manner so that the distance between the spot position at which the zeroth-order diffracted beam is incident on the light-receiving region 9 for receiving the zeroth-order diffracted beam and the spot position at which the first-order diffracted beam are incident on the light-receiving regions 21 and 22 for receiving the first-order diffracted beam can be adjusted. Therefore, by swinging the beam-shaping prism 1 in the direction indicated by the double-headed arrow A1 during the process of assembling and adjusting the optical head, it is possible to adjust the spot positions of the first-order diffracted beams to be in the center portions of the light-receiving regions 21 and 22, respectively.

Figure 6:
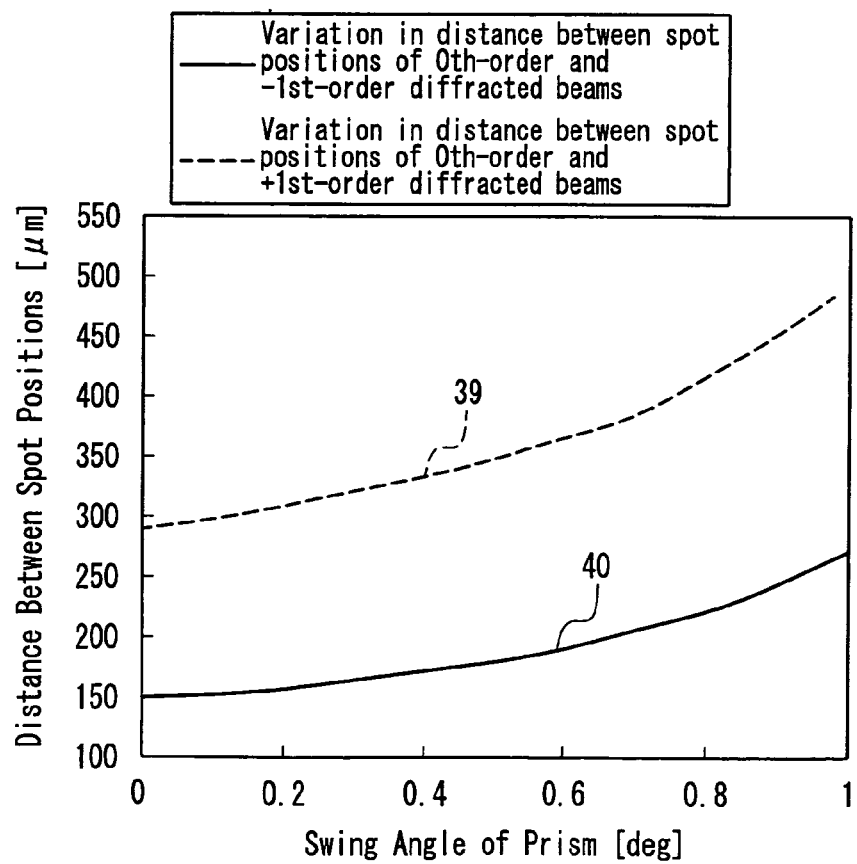
FIG. 6 is a graph showing the relationship between a swing angle of a beam-shaping prism provided in the optical head according to Embodiment 1 and a distance between spot positions of diffracted beams.

FIG. 6 is a graph showing the relationship between a swing angle of the beam-shaping prism 1 and the distance between the spot positions of the diffracted beams. A curve 39 represents the relationship between a swing angle of the beam-shaping prism 1 and a distance between the spot position of the zeroth-order diffracted beam and the spot position of the positive first-order diffracted beam. On the other hand, a curve 40 represents the relationship between a swing angle of the beam-shaping prism 1 and a distance between the spot position of the zeroth-order diffracted beam and the spot position of the negative first-order diffracted beam. As shown by the curve 40 in FIG. 6, when the beam-shaping prism 1 is swung around the Y-axis through an angle of 0.5°, the distance between the spot position of the negative first-order diffracted beam and the spot position of the zeroth-order diffracted beam changes from 147 μm to 186 μm, whereby the distance is allowed to be increased by 39 μm.

Figure 7:
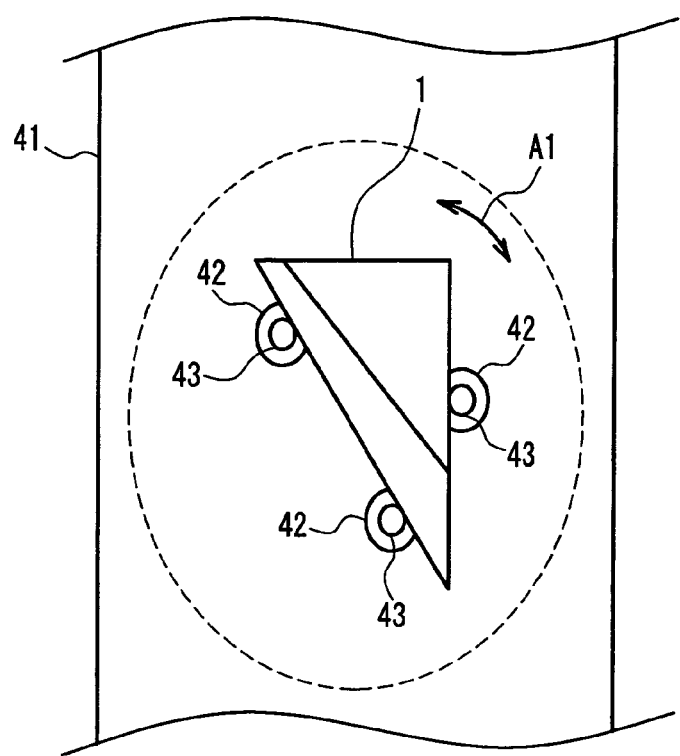
FIG. 7 is a plan view for illustrating an example of a device for swinging a beam-shaping prism provided in the optical head according to Embodiment 1.
Figure 8:
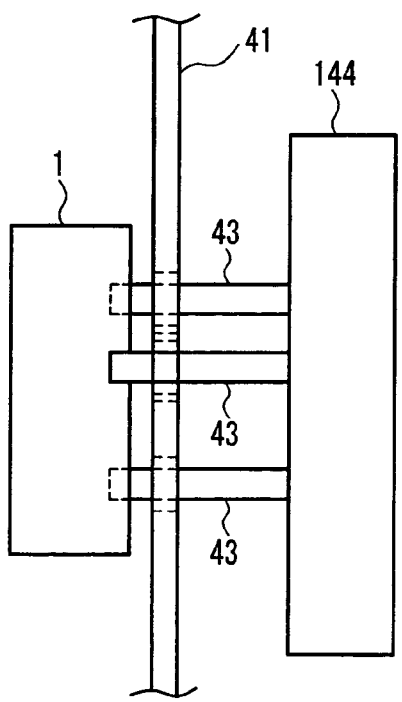
FIG. 8 is a side view for illustrating the device shown in FIG. 7 for swinging the beam-shaping prism provided in the optical head according to Embodiment 1.

FIG. 7 is a plan view for illustrating an example of a device for swinging the beam-shaping prism 1 provided in the optical head 100 according to Embodiment 1, and FIG. 8 is a side view of the same. The device includes a swingable stage 144. On the swingable stage 144, three pins 43, sticking up through holes 42 formed on an optical base 41, are provided so as to hold the beam-shaping prism 1.

In the device having the above-described configuration, when the swingable stage 144 is swung by a driving device (not shown), the beam-shaping prism 1 held by the three pins 43 is swung in the direction indicated by the double-headed arrow A1. Therefore, it is possible to correct the distance between the spot position of the zeroth-order diffracted beam and the spot position of the first-order diffracted beams.

Figure 9:
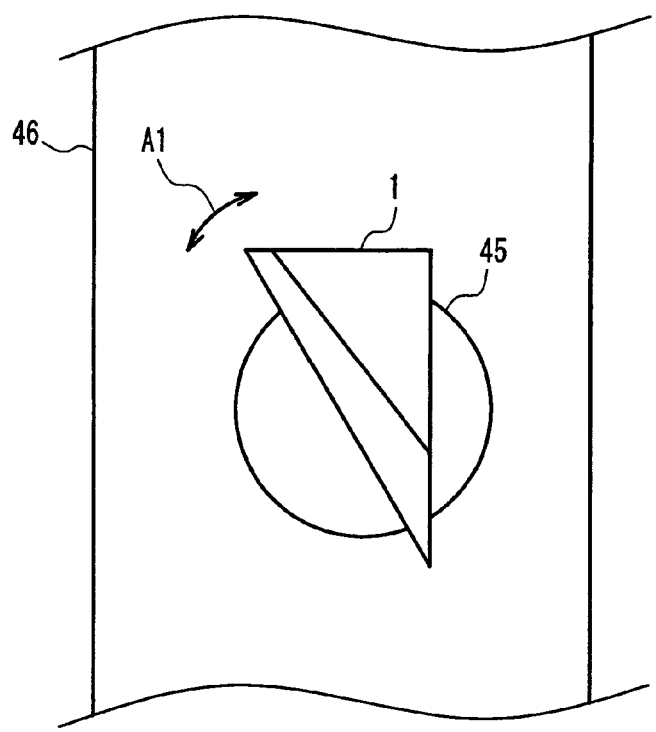
FIG. 9 is a plan view for illustrating another example of a device for swinging a beam-shaping prism provided in the optical head according to Embodiment 1.
Figure 10:
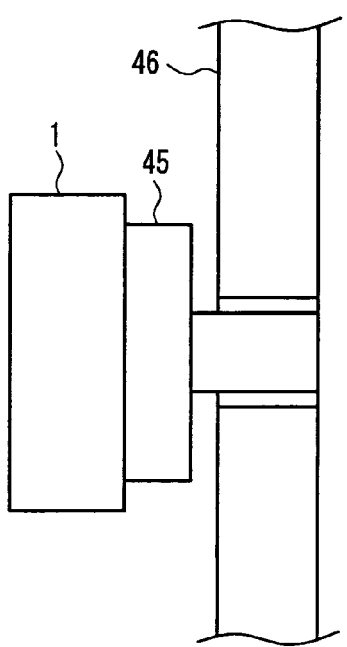
FIG. 10 is a side view for illustrating the device shown in FIG. 9 for swinging the beam-shaping prism provided in the optical head according to Embodiment 1.

FIG. 9 is a plan view for illustrating another example of a device for swinging the beam-shaping prism 1, and FIG. 10 is a side view of the same. This device includes a swingable component 45 having a stepped cylinder shape. The swingable component 45 is inserted in a hole formed on a base 46 so as to be swingable relative to the base 46. On the swingable component 45, the beam-shaping prism 1 is disposed.

In the device having the above-described configuration, when the swingable component 45 is swung relative to the base 46 by a driving device (not shown), the beam-shaping prism 1 disposed on the swingable component 45 is swung in the direction indicated by the double-headed arrow A1. Therefore, it is possible to correct the distance between the spot position of the zeroth-order diffracted beam and the spot position of the first-order diffracted beams.

Figure 11:
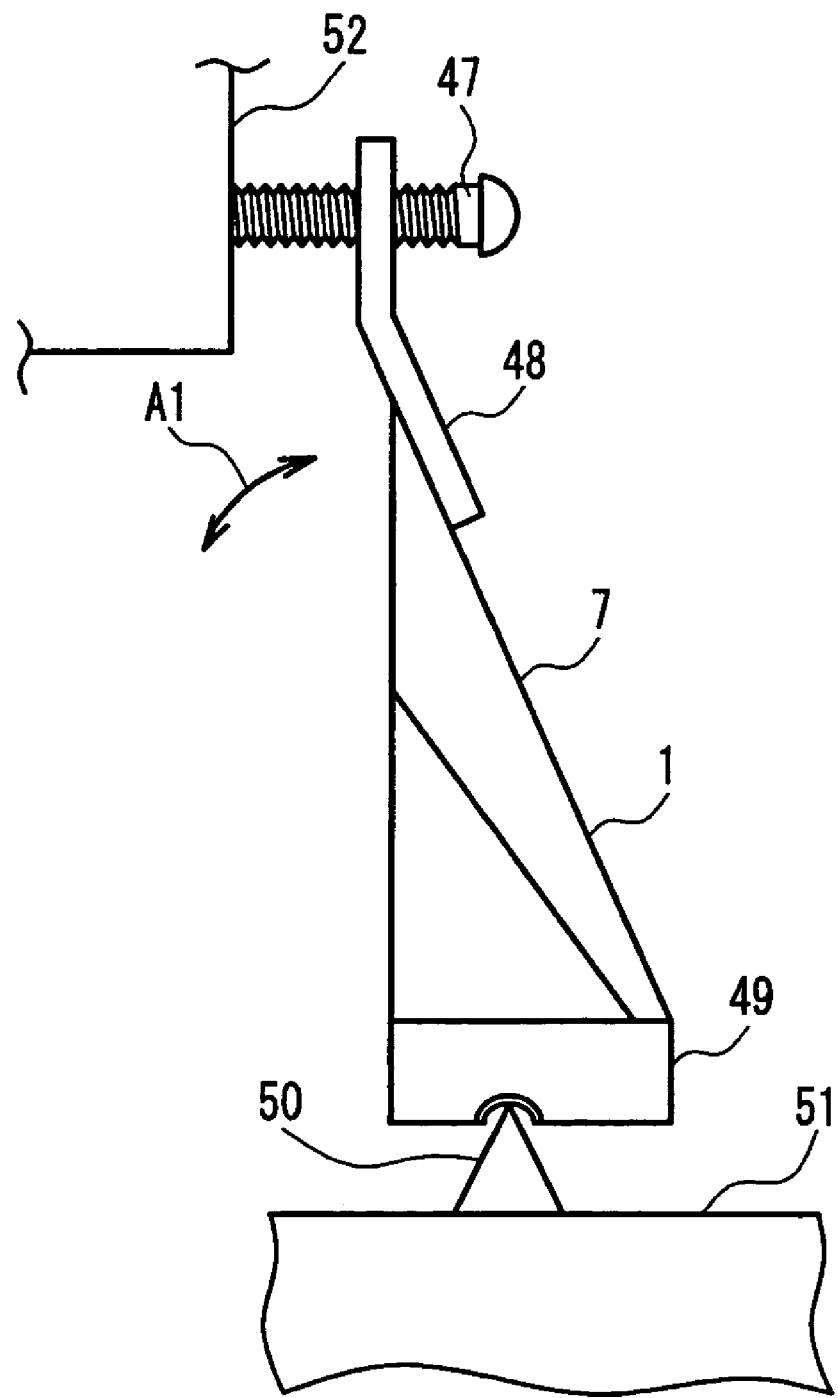
FIG. 11 is a plan view for illustrating still another example of a device for swinging a beam-shaping prism provided in the optical head according to Embodiment 1.

FIG. 11 is a plan view for illustrating still another example of a device for swinging the beam-shaping prism 1. This device includes a base 51. On the base 51, a support member 50 is provided. This support member 50 supports a substantially rectangular member 49 in a swingable manner. The beam-shaping prism 1 is attached to the surface of the member 49 on the side opposite to the support member 50. The device further includes a base 52. A screw 47 is screwed partially in the base 52, and a plate spring 48 is fixed on the screw 47. The plate spring 48 is in contact with the entrance surface 7 of the beam-shaping prism 1.

In the device having the above-described configuration, when the screw 47 is screwed further into the base 52, the plate spring 48 is distorted so as to press the entrance surface 7 of the beam-shaping prism 1. Thus, the beam-shaping prism 1 is swung around the support member 50 in the direction indicated by the double-headed arrow A1. Therefore, it is possible to correct the distance between the spot position of the zeroth-order diffracted beam and the spot position of the first-order diffracted beams.

As specifically described above, according to Embodiment 1 of the present invention, the beam-shaping prism 1 is provided in a swingable manner so that the distance between the spot position at which the zeroth-order diffracted beam is incident on the detector 2 and the spot position at which the first-order diffracted beams are incident on the detector 2 can be adjusted. Therefore, it is possible to correct the distance between the spot position of the zeroth-order diffracted beam and the spot position of the first-order diffracted beams. As a result, it becomes possible to obtain a good detection signal based on the zeroth-order diffracted beam and the first-order diffracted beams.

Although Embodiment 1 has shown an example where the spot positions of the first-order diffracted beams are adjusted so as to be in the center portions of the light-receiving regions 21 and 22, respectively, by swinging the beam-shaping prism 1 in the direction indicated by the double-headed arrow A1 during the process of assembling and adjusting the optical head, the present invention is not limited thereto. As shown in FIG. 1, a spot position detector 16 for detecting the distance between the spot position of the zeroth-order diffracted beam and the spot position of the first-order diffracted beams, a driving device 17 for swinging the beam-shaping prism 1, and a controller 18 for controlling the driving device 17 so that the beam-shaping prism 1 is swung based on the distance, which has been detected by the spot position detector 16, between the spot position of the zeroth-order diffracted beam and the spot position of the first-order diffracted beams may further be provided so that the distance between the spot position of the zeroth-order diffracted beam and the spot position of the first-order diffracted beams is corrected automatically.

EMBODIMENT 2

Figure 12:
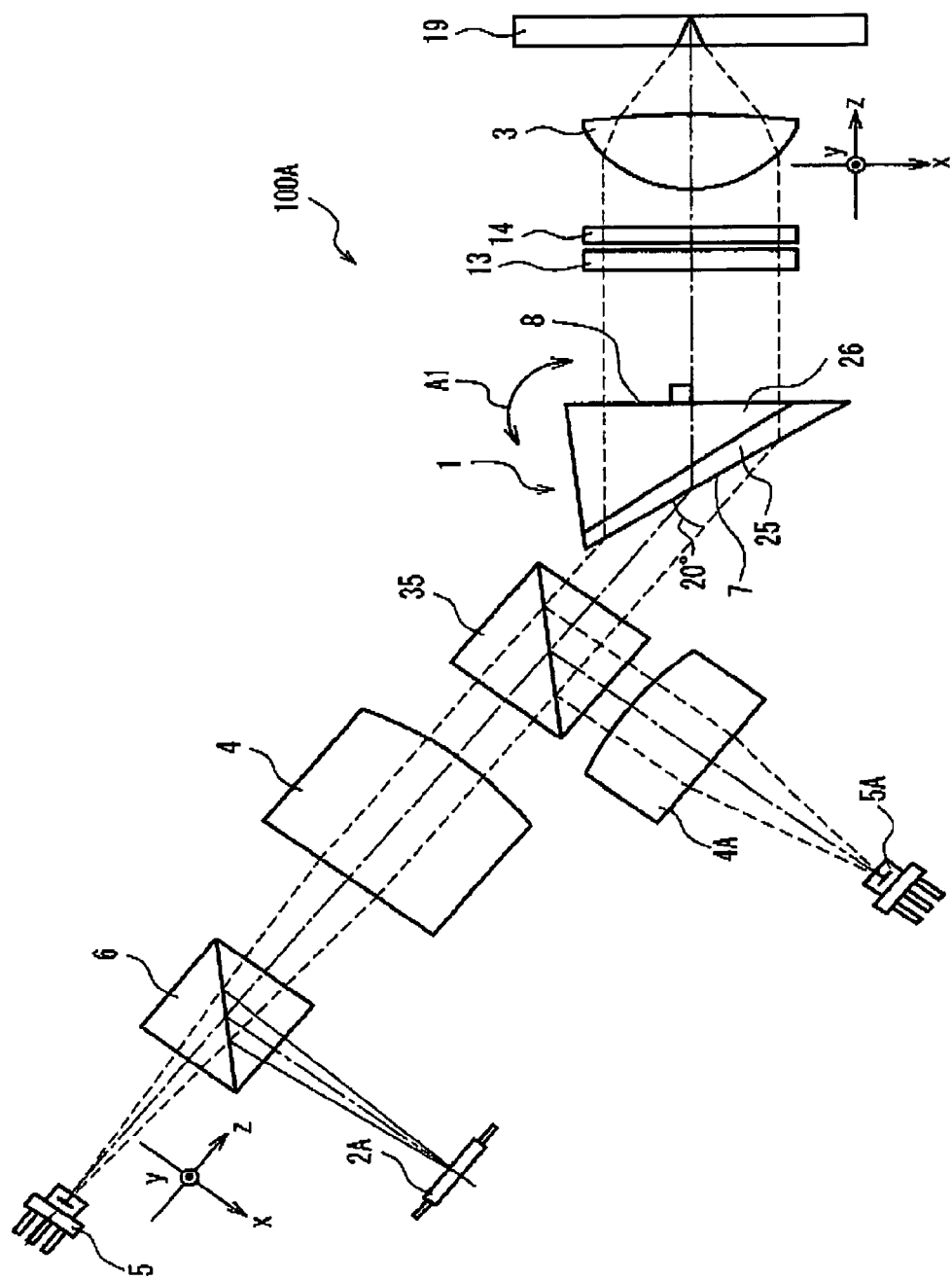
FIG. 12 is a view schematically showing the configuration of an optical head according to Embodiment 2 of the present invention.
Figure 13:
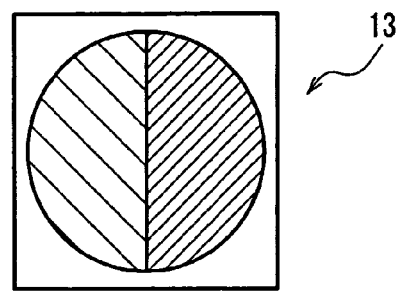
FIG. 13 is a view for illustrating the arrangement of polarization hologram patterns of a polarization hologram element provided in the optical head according to Embodiment 2.
Figure 14:
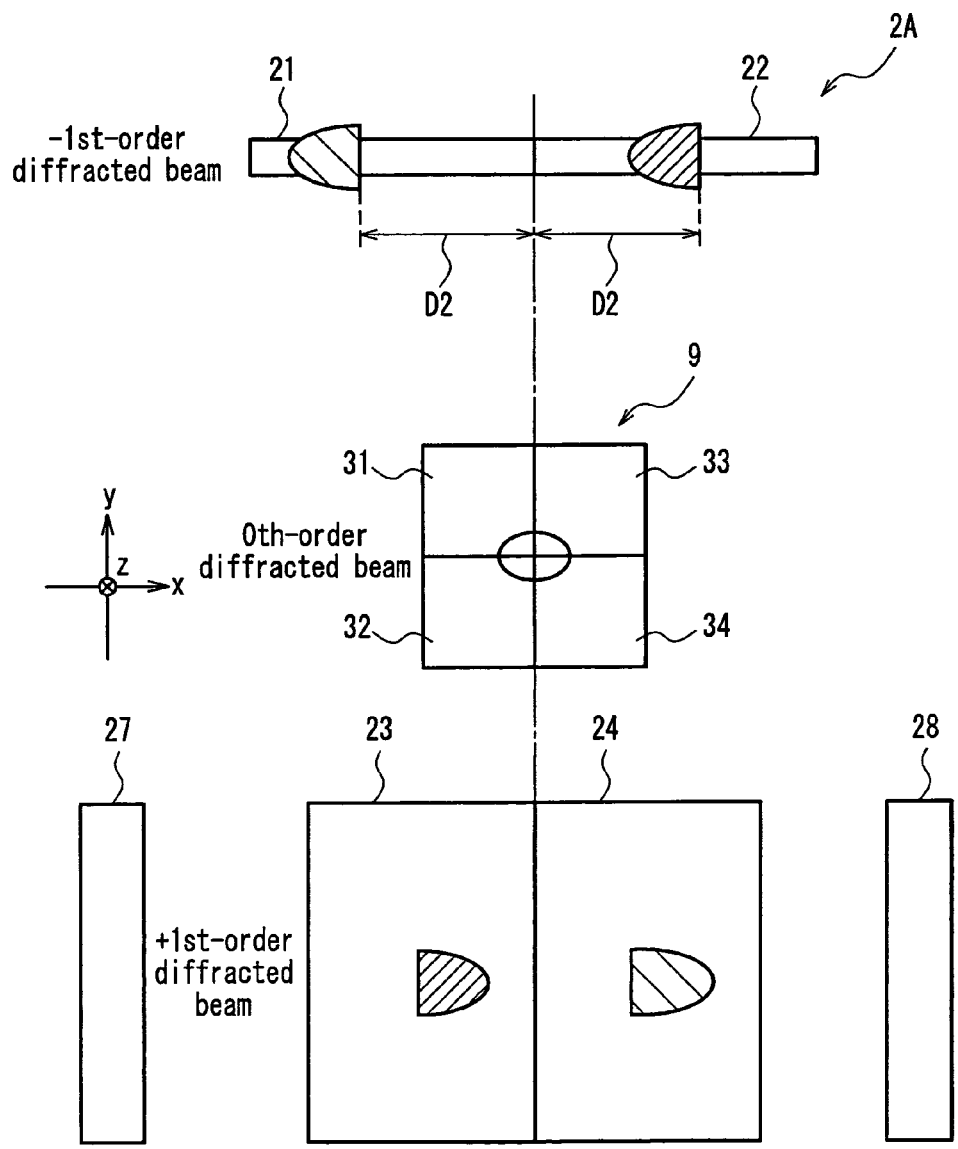
FIG. 14 is a plan view schematically showing a detector provided in the optical head according to Embodiment 2.
Figure 15:
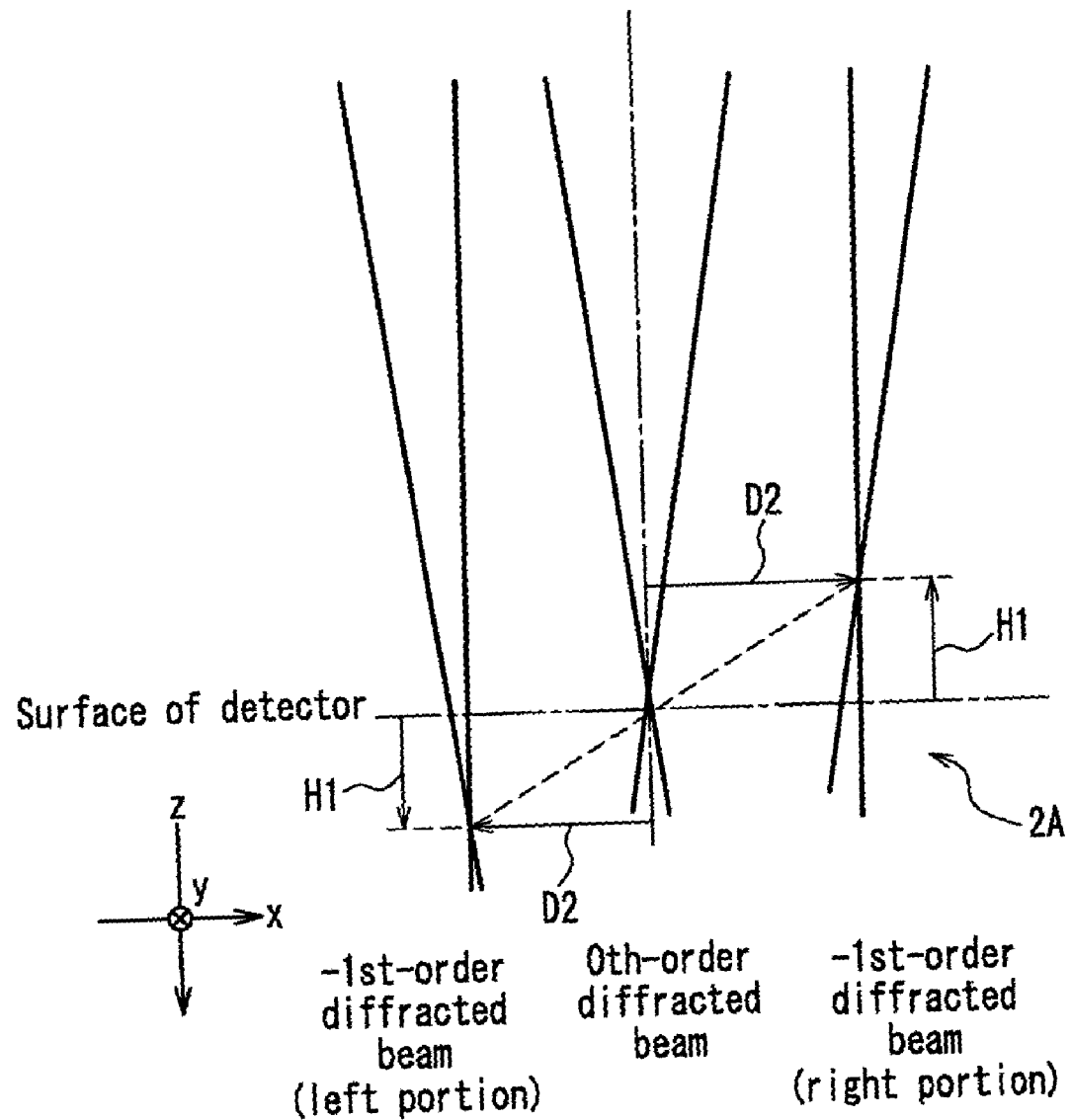
FIG. 15 is a schematic view for illustrating the focal positions of diffracted beams incident on the detector provided in the optical head according to Embodiment 2.
Figure 16A:
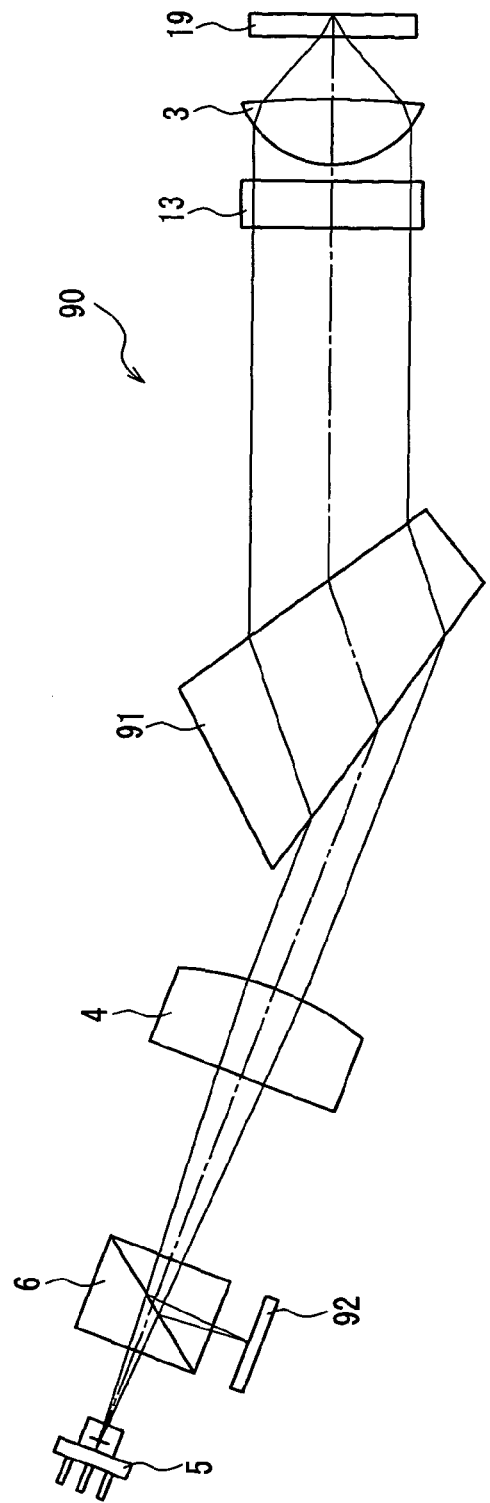
FIG. 16A is a front view schematically showing the configuration of a conventional optical head.
Figure 16B:
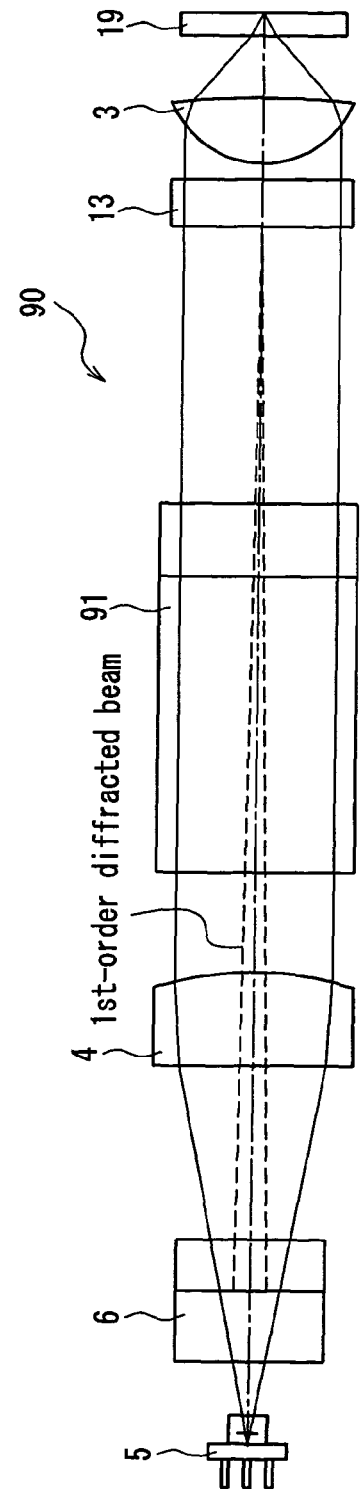
FIG. 16B is a plan view of the same.
Figure 17:
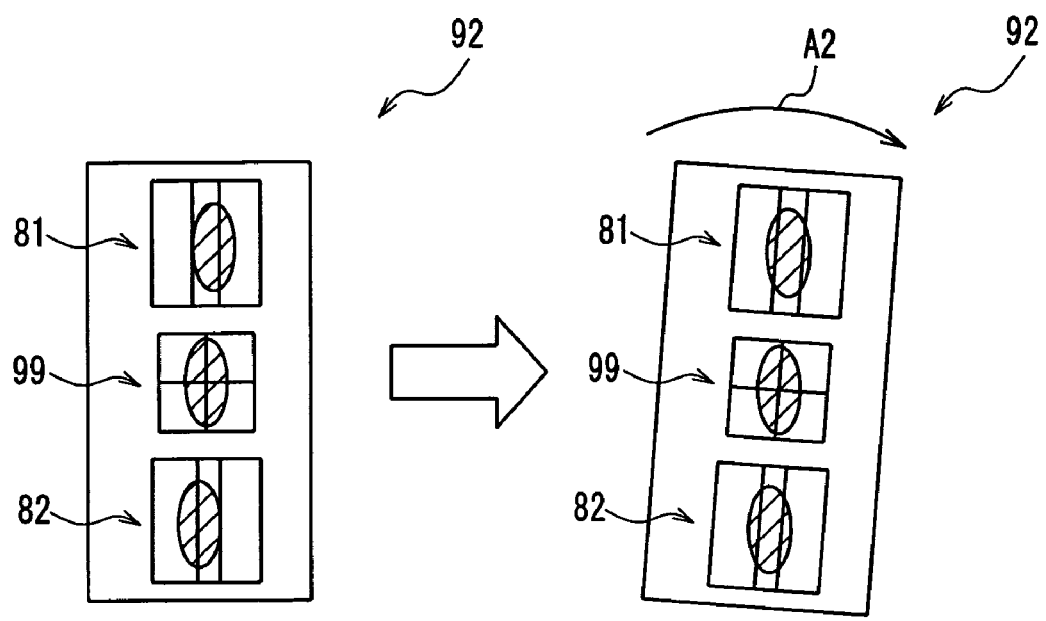
FIG. 17 is a schematic view for illustrating the spot positions of diffracted beams incident on a detector provided in the conventional optical head shown in FIGS. 16A and 16B.
Figure 18:
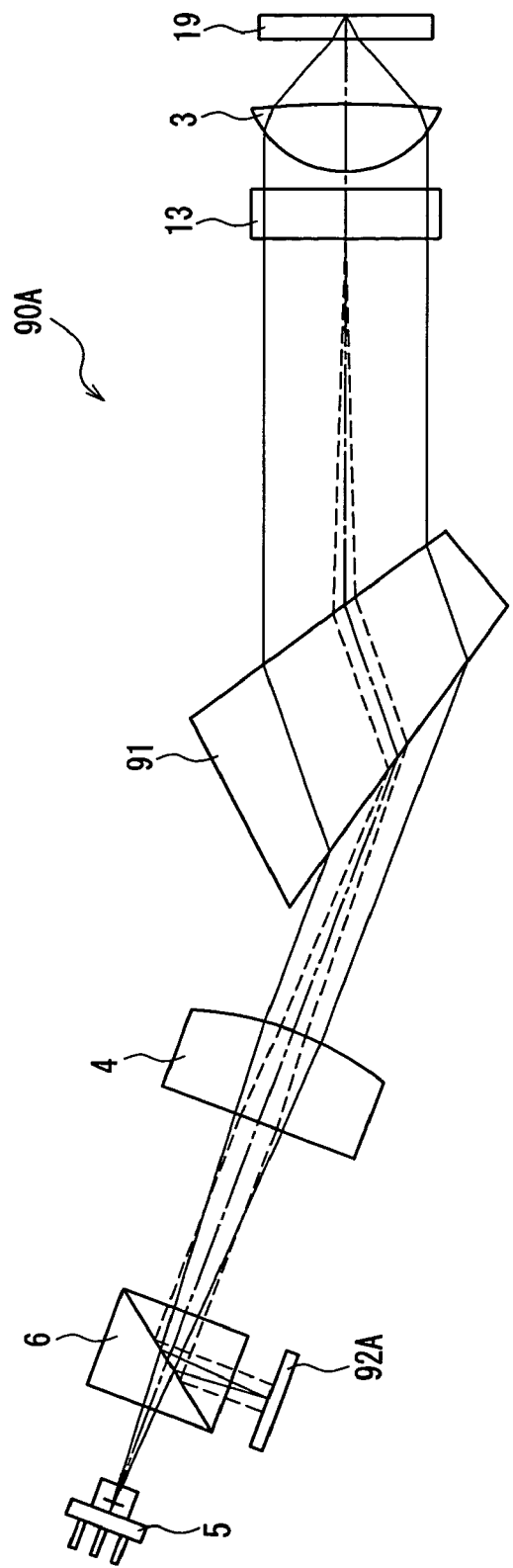
FIG. 18 is a view schematically showing the configuration of another conventional optical head.
Figure 19:
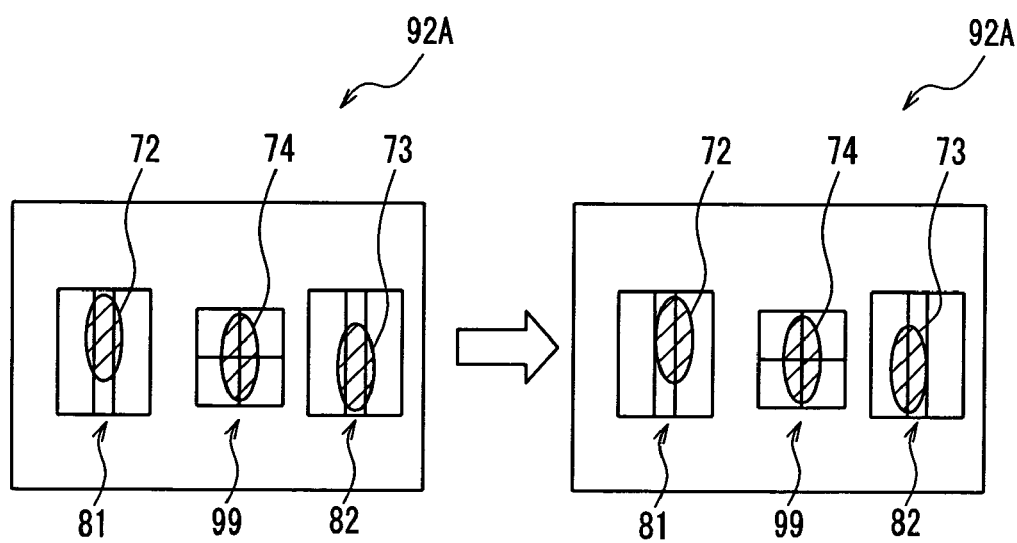
FIG. 19 is a schematic view for illustrating the spot positions of diffracted beams incident on a detector provided in the another conventional optical head.

FIG. 12 is a view schematically showing the configuration of an optical head 100A according to Embodiment 2 of the present invention. FIG. 13 is a view for illustrating the arrangement of polarization hologram patterns of a hologram 13 provided in the optical head 100A. FIG. 14 is a plan view schematically showing a detector 2A provided in the optical head 100A. FIG. 15 is a schematic view for illustrating focal positions of diffracted beams incident on the detector 2A. In FIGS. 12 to 15, the same components as those in the optical head 100 according to Embodiment 1 described above with reference to FIGS. 1 to 6 bear the same reference numerals, and their detailed explanation thus has been omitted. The optical head 100A differs from the above-described optical head 100 in that it further includes a semiconductor laser source 5A, a collimator lens 4A, and a dichroic prism 35, and employs the detector 2A in place of the detector 2.

The semiconductor laser source 5A emits a beam having a wavelength of 790 nm to a collimator lens 4A having a focal length of 10.0 mm. The collimator lens 4A converts the incident beam into a parallel beam and then emits the parallel beam to the dichroic prism 35.

The dichroic prism 35 is formed of a film that totally transmits the beam at a wavelength of 657 nm and totally reflects only a linear polarization plane in the backward optical path (the optical path along which the beam reflected by the optical disk 19 travels) at a wavelength of 790 nm. Therefore, the dichroic prism 35 totally reflects the parallel beam emitted from the collimator lens 4A and having a wavelength of 790 nm, whereby the parallel beam is emitted to the beam-shaping prism 1.

The beam-shaping prism 1 has a refractive index of 1.775911 at a wavelength of 657 nm and a refractive index of 1.765341 at a wavelength of 790 nm.

The parallel beam reflected totally by the dichroic prism 35 is incident at an angle slightly different from 20° on the entrance surface 7 of the beam-shaping prism 1. The beam-shaping prism 1 shapes the incident parallel beam so that the width thereof is expanded by a factor of 2.5 by refracting the parallel beam at the above-mentioned refractive index at a wavelength of 790 nm. The parallel beam from the semiconductor laser source 5A that has been shaped by the beam-shaping prism 1 is emitted in the direction perpendicular to the emission surface 8, similarly to the parallel beam from the semiconductor laser source 5.

The parallel beam from the semiconductor laser source 5A that has been emitted from the emission surface 8 of the beam-shaping prism 1 passes through the hologram 13 and a quarter-wave plate 14. After passing through the quarter-wave plate 14, the parallel beam becomes a circularly polarized light and then is incident on an objective lens 3. The objective lens 3, having a focal length of 3.0 mm and a numerical aperture NA of 0.6, converges the incident parallel beam on an optical disk 19.

FIG. 13 is a view for illustrating the arrangement of polarization hologram patterns of the hologram 13. The parallel beam from the semiconductor laser source 5A is reflected by the optical disk 19 and passes through the objective lens 3 and the quarter-wave plate 14. After passing through the quarter-wave plate 14, the parallel beam becomes a linearly polarized light orthogonal to the forward optical path. The linearly polarized light then passes through the hologram 13. Because the parallel beam has a polarization plane orthogonal to the forward optical path, it is split into a zeroth-order diffracted beam and first-order diffracted beams after passing through the hologram 13.

The parallel beam from the semiconductor laser source 5A that has been split into the zeroth-order diffracted beam and the first-order diffracted beams by the hologram 13 is incident on the beam-shaping prism 1 again. This time, contrary to the case where the beam travels along the forward optical path, the beam-shaping prism 1 shapes the parallel beam so that the width thereof is reduced by a factor of 2.5. The parallel beam thus shaped is then emitted to the dichroic prism 35. Because the polarization plane of the parallel beam incident on the dichroic prism 35 is orthogonal to the forward optical path, the parallel beam passes through the dichroic prism 35 to be incident on the collimator lens 4.

The parallel beam passes through the collimator lens 4 to be incident on the polarization beam splitter 6. Because the polarization plane of the beam from the semiconductor laser source 5A that has entered the polarization beam splitter 6 is orthogonal to the forward optical path, the beam is reflected by the polarization beam splitter 6 to be incident on a detector 2A.

FIG. 14 is a plan view schematically showing the detector 2A. The detector 2A has a light-receiving region 9 for receiving the zeroth-order diffracted beam contained in the incident beam from the semiconductor laser source 5. The light-receiving region 9 has a substantially square shape and is divided into four regions 31, 32, 33, and 34 having a square shape.

The detector 2A has two light-receiving regions 21 and 22, each having a substantially rectangular shape, for receiving the negative first-order diffracted beam contained in the incident beam from the semiconductor laser source 5. The light-receiving regions 21 and 22 are arranged so as to be adjacent to each other along the beam-shaping direction (the X-axis direction). The detector 2A also has two light-receiving regions 23 and 24, having a substantially rectangular shape, for receiving the positive first-order diffracted beam contained in the incident beam from the semiconductor laser source 5. The light-receiving regions 23 and 24 are arranged so as to oppose the light-receiving regions 21 and 22, respectively, with the light-receiving region 9 intervening therebetween.

Each of the light-receiving regions 21 to 24 is divided along the beam-shaping direction (the X-axis direction) so as to provide three regions (not shown) having a substantially rectangular shape.

FIG. 15 is a schematic view for illustrating focal positions of the diffracted beam incident on the detector 2A. The negative first-order diffracted beam to be incident on the light-receiving region 21 enters the light-receiving region 21 in such a manner that it comes into focus at a position that is at a depth of H1 from the surface of the detector 2 and away from the center of the light-receiving region 9 in the beam-shaping direction (the X-axis direction) toward the light-receiving region 21 by the distance D2. On the other hand, the negative first-order diffracted beam to be incident on the light-receiving region 22 enters the light-receiving region 22 in such a manner that it comes into focus at a position that is at a height of H1 from the surface of the detector 2 and away from the center of the light-receiving region 9 in the beam-shaping direction (the X-axis direction) toward the light-receiving region 22 by the distance D2.

The detector 2A has a light-receiving region (not shown) for receiving the zeroth-order diffracted beam contained in the incident beam from the semiconductor laser source 5A. After passing through the beam-shaping prism 1, the angle of the beam from the semiconductor laser source 5A is different from that of the beam from the semiconductor laser source 5. Thus, in the detector 2A, the above-described light-receiving region (not shown) and the light-receiving region 9 are provided at different locations. This light-receiving region is not shown in FIG. 14 for the sake of clarification.

The detector 2A also has two light-receiving regions 27 and 28, having a substantially rectangular shape, for receiving first-order diffracted beams contained in the incident beam from the semiconductor laser source 5A. The light-receiving regions 27 and 28 are arranged with the light-receiving regions 23 and 24 intervening therebetween.

Each of the light-receiving regions 27 and 28 is divided along the Y-axis direction perpendicular to the beam-shaping direction (the X-axis direction) so as to provide three regions (not shown) having a substantially rectangular shape.

Then, based on a detection signal f3 that has been detected based on the first-order diffracted beam incident on the light-receiving region 27 and a detection signal f4 that has been detected based on the first-order diffracted beam incident on the light-receiving region 28, a focus error signal fe is generated according to a spot size detection (SSD) method using the following Equation (2).

$$fe = f3 - f4 \qquad (2)$$

Because each of the light-receiving regions 27 and 28 is divided along the Y-axis direction perpendicular to the beam-shaping direction (the X-axis direction), they are not susceptible to the influence of the displacement of the detector in the Y-axis direction. In addition, even when the magnification at which the width of the beam is expanded or reduced by the beam-shaping prism 1 changes, the distance between the spot positions of the diffracted beams never change.

Further, the spot positions of the beams from semiconductor laser source 5A can be adjusted so as to be in the center portions of the light-receiving regions 27 and 28, respectively, by swinging the detector 2A only slightly. It is to be noted here that, even when the detector 2A is swung, the light-receiving regions 21 to 24 for receiving the beam from the semiconductor laser source 5 are not susceptible to the influence of this swinging because each of them is divided along the beam-shaping direction (the X-axis direction). Thus, it is possible to adjust the spot positions of the beams from the semiconductor laser source 5 and those from the semiconductor laser source 5A, independently.

As specifically described above, the optical head according to Embodiment 2 includes the first detector, having the light-receiving region 9 for receiving the zeroth-order diffracted beam and the light-receiving regions 21 to 24 for receiving the first-order diffracted beam, for detecting an electric signal based on the first zeroth-order diffracted beam and the first first-order diffracted beam contained in the parallel beam from the semiconductor laser source 5 that has been reflected by the optical disk 19 and passed through the objective lens 3, and the second detector, having the light-receiving region for receiving the zeroth-order diffracted beam and the light-receiving regions 27 and 28 for receiving the first-order diffracted beam, for detecting an electric signal based on the second zeroth-order diffracted beam and the second first-order diffracted beam contained in the parallel beam from the semiconductor laser source 5A that has been reflected by the optical disk 19 and passed through the objective lens 3. In the optical head, the beam-shaping prism 1 is provided in a swingable manner so that a distance between a spot position at which the first zeroth-order diffracted beam is incident on the first detector and a spot position at which the first first-order diffracted beam is incident on the first detector can be adjusted. Therefore, it is possible to correct the distance between the spot position of the zeroth-order diffracted beam and the spot position of the first-order diffracted beams. As a result, it becomes possible to obtain a good detection signal based on the zeroth-order diffracted beam and the first-order diffracted beams.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical head comprising:
    a shaping element for shaping a beam emitted from a light source;
    a converging element for converging the beam that has been shaped by the shaping element on an optical recoding medium;
    a first detector for detecting an electric signal based on a zeroth-order diffracted beam and a first-order diffracted beam contained in the beam that has been reflected by the optical recoding medium;
    a second detector for detecting the distance between the spot position of the zeroth-order diffracted beam and the spot position of the first-order diffracted beam;
    driving means for swinging the shaping element; and
    controlling means for controlling the driving means so that the shaping element is swung based on the distance, which has been detected by the second detector, between the spot position of the zeroth-order diffracted beam and the spot position of the first-order diffracted beam.
    wherein the shaping element is provided in a swingable manner so that a distance between a spot position at which the zeroth-order diffracted beam is incident on the detector and a spot position at which the first-order diffracted beam is incident on the detector can be adjusted.

2. The optical head according to claim 1, further comprising a collimator lens for converting the beam emitted from the light source into a substantially parallel beam,
    wherein the shaping element is used for shaping the substantially parallel beam emitted from the collimator lens and is provided so as to be swingable around a swing axis that is perpendicular to a direction along which the substantially parallel beam is shaped and perpendicular to a travel direction of the substantially parallel beam.

3. The optical head according to claim 1, wherein the detector has a light-receiving region for receiving the zeroth-order diffracted beam and a light-receiving region for receiving the first-order diffracted beam, and these light-receiving regions are arranged in a direction along which the zeroth-order diffracted beam and the first-order diffracted beam are shaped.

4. The optical head according to claim 3, wherein the shaping element is provided in a swingable manner so that the spot position of the first-order diffracted beam can be adjusted to be in a center portion of the light-receiving region for receiving the first-order diffracted beam.

5. The optical head according to claim 3, wherein the light-receiving region for receiving the first-order diffracted beam is divided along a direction perpendicular to the direction along which the zeroth-order diffracted beam and the first-order diffracted beam are shaped.

6. The optical head according to claim 1, wherein the detector has a light-receiving region for receiving the zeroth-order diffracted beam and two light-receiving regions for receiving the first-order diffracted beam.

7. The optical head according to claim 6, wherein the light-receiving region for receiving the zeroth-order diffracted beam is arranged between the two light-receiving regions for receiving the first-order diffracted beam.

8. The optical head according to claim 1, further comprising a polarization beam splitter for changing a travel direction of a substantially parallel beam that has been reflected by the optical recoding medium and passed through the converging clement.

9. The optical bead according to claim 8, wherein the detector detects the electric signal based on the substantially parallel beam whose travel direction has been changed by the polarization beam splitter.

10. The optical head according to claim 8, wherein the polarization beam splitter is arranged between the light source and the shaping element.

11. The optical head according to claim 2, wherein the shaping element has an entrance surface from which the substantially parallel beam that has been convened from the beam by the collimator lens enters and an emission surface from which the substantially parallel beam that has been shaped by the shaping element is emitted to the converging element, the entrance surface and the emission surface being formed so as not to be parallel with each other.

12. The optical head according to claim 1, wherein the shaping element is formed by bonding a plurality of optical materials together, refractive indices of these optical materials being different from one another.

13. The optical head according to claim 1, wherein the shaping element is formed by bonding a plurality of optical materials together, variations in the refractive indices of these optical materials depending on a wavelength being different from one another.

14. The optical head according to claim 1, wherein the light source and the detector are formed integrally.

* * * * *

UNITED STATES PATENT AND TRADEMARK OFFICE
CERTIFICATE OF CORRECTION

PATENT NO. : 7,145,844 B2  Page 1 of 1
APPLICATION NO. : 10/615676
DATED : December 5, 2006
INVENTOR(S) : Nagashima et al.

It is certified that error appears in the above-identified patent and that said Letters Patent is hereby corrected as shown below:

On Title Page
Item 57
Page 1, second column, line 7 of the Abstract: "optical recoding medium" should read --optical recording medium--.
Item 57
Page 1, second column, line 10 of the Abstract: "optical recoding medium" should read --optical recording \ medium--.
Column 14, lines 29-30(claim 1): "optical recoding medium" should read --optical recording medium--.
Column 14, line 34(claim 1): "optical recoding medium" should read --optical recording medium--.
Column 15, line 22(claim 8): "optical recoding medium" should read --optical recording medium--.
Column 15, line 23(claim 8): "clement" should read --element--.
Column 16, line 6(claim 11): "convened" should read --converted--.

Signed and Sealed this

Sixteenth Day of October, 2007

JON W. DUDAS
*Director of the United States Patent and Trademark Office*